(12) United States Patent
Lee

(10) Patent No.: US 8,369,037 B2
(45) Date of Patent: Feb. 5, 2013

(54) ACTUATOR ASSEMBLY AND OPTICAL SYSTEM HAVING THE SAME

(75) Inventor: Seung-hwan Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 61 days.

(21) Appl. No.: 13/152,456

(22) Filed: Jun. 3, 2011

(65) Prior Publication Data

US 2012/0014003 A1 Jan. 19, 2012

(30) Foreign Application Priority Data

Jul. 14, 2010 (KR) ........................ 10-2010-0068011

(51) Int. Cl.
*G02B 7/02* (2006.01)
*G02B 15/14* (2006.01)
*H01L 41/00* (2006.01)

(52) U.S. Cl. ........ 359/824; 359/823; 359/694; 359/696; 310/323.01; 310/323.02; 310/323.16; 310/316.01; 310/317; 310/318; 310/328; 396/55

(58) Field of Classification Search .................. 359/823, 359/824, 696, 698, 699; 310/12.31, 317, 310/318, 323.02, 323.16, 328; 74/490.09, 74/490.08; 396/55, 72; 348/207.99, 374; 369/13.2, 13.11
See application file for complete search history.

(56) References Cited

U.S. PATENT DOCUMENTS

| | | | | |
|---|---|---|---|---|
| 5,170,088 A * | 12/1992 | Naito et al. | ............... | 310/323.16 |
| 6,104,122 A * | 8/2000 | Ishimaru | ................... | 310/323.02 |
| 6,732,610 B2 * | 5/2004 | Higuchi et al. | ............ | 74/490.09 |
| 6,909,673 B2 * | 6/2005 | Ishii et al. | ................... | 369/13.12 |
| 7,187,104 B2 * | 3/2007 | Yamamoto et al. | ...... | 310/323.02 |
| 7,432,635 B2 * | 10/2008 | Kawai | ....................... | 310/323.17 |
| 7,508,114 B2 * | 3/2009 | Kasai et al. | .............. | 310/323.16 |
| 7,573,180 B2 * | 8/2009 | Funakubo | ................. | 310/316.01 |
| 7,678,974 B2 * | 3/2010 | Larkins et al. | ............. | 800/320.1 |
| 7,732,983 B2 * | 6/2010 | Kasai | ....................... | 310/323.17 |
| 7,759,840 B2 * | 7/2010 | Funakubo et al. | ........ | 310/323.01 |
| 8,164,233 B2 * | 4/2012 | Mukae | ...................... | 310/323.01 |

* cited by examiner

*Primary Examiner* — Loha Ben
(74) *Attorney, Agent, or Firm* — Drinker Biddle & Reath LLP

(57) ABSTRACT

An actuator assembly including a slider configured to be slidable along a sliding direction; and a driving force applying unit comprising a plurality of contact portions disposed to be spaced apart from each other in a direction crossing the sliding direction of the slider and for applying force to the slider by vibrating the contact portions. An optical system including a lens assembly comprising a lens unit comprising at least one lens and a moveable lens frame supporting the lens unit; and an actuator assembly as disclosed above. A driving force applying unit including a plurality of contact portions configured to contact the base plate and disposed in the slider to be spaced apart from each other in a direction crossing the sliding direction and configured to apply force to the base plate by vibrating the contact portions.

20 Claims, 9 Drawing Sheets

ACTUATOR ASSEMBLY AND OPTICAL SYSTEM HAVING THE SAME

CROSS-REFERENCE TO RELATED PATENT APPLICATION

This application claims the benefit of Korean Patent Application No. 10-2010-0068011, filed on Jul. 14, 2010, in the Korean Intellectual Property Office, the entire disclosure of which is incorporated herein by reference.

BACKGROUND

1. Field of the Invention

The invention relates to an actuator assembly, and more particularly, to an actuator assembly that utilizes vibrating members for applying force to a slider.

2. Description of the Related Art

Optical systems include optical elements such as lenses, and a lens driving device to move the lenses. To perform zooming and auto-focusing the optical system uses a lens driving device to change the distance between the lenses.

Often the lens driving device moves the lenses by using a stepper motor, which may require the use of a deceleration gear, and a cam to change the rotational motion of the stepper motor into a linear motion.

The stepper motor and the other parts increase the size and complexity of the optical system. The increased size and complexity make it more difficult to switch directions of movement, and consume more power which generates heat.

The lenses of the optical system may instead be moved by using a piezoelectric element. Piezoelectric elements have recently been widely used for such a purpose. A very small driving motor may be manufactured by using such a piezoelectric element.

However, since a conventional optical system using a piezoelectric element uses a gear or a cam in order to change a deformation of the piezoelectric element into a driving motion for moving the lenses, the structure of the optical system is complicated and it is difficult to achieve precise position control due to an error that may occur between mechanical elements.

SUMMARY

Therefore, there is a need in the art for an actuator assembly including a slider configured to be slidable along a sliding direction; and a driving force applying unit comprising a plurality of contact portions disposed to be spaced apart from each other in a direction crossing the sliding direction of the slider and for applying force to the slider by vibrating the contact portions.

The driving force applying unit may further include a plurality of elastic plates comprising the contact portions on first surfaces thereof, a plurality of piezoelectric elements respectively disposed on the elastic plates, the plurality of piezoelectric elements may be configured to generate vibrations when electrical signals are applied thereto, and a base plate for supporting the elastic plates.

The actuator assembly may further be configured to apply different electrical signals to the piezoelectric elements via different electrical wirings connected to the piezoelectric elements.

The actuator assembly may further be configured to apply electrical signals having different phases to the piezoelectric elements.

The actuator assembly may further be configured to apply electrical signals having different cycles to the piezoelectric elements.

The contact portions may be configured to alternately contact the slider.

The elastic plates may include respective mounting portions coupled to the base plate and respective elastic support portions extending toward the slider from the mounting portions and spaced apart from the base plate, wherein the contact portions may be respectively disposed on the elastic support portions.

The mounting portions of at least two of the elastic plates may be connected to each other.

The actuator assembly may further be configured to apply a common signal to the elastic plates and different signals to the piezoelectric elements, and wherein the piezoelectric elements may be connected to different electrical wirings.

The contact portions may be disposed at a side of the slider.

The contact portions may be disposed symmetrically around the slider.

An optical system is disclosed. The optical system may include a lens assembly comprising a lens unit comprising at least one lens and a moveable lens frame supporting the lens unit; and an actuator assembly comprising a slider slidable along a sliding direction, and a driving force applying unit including a plurality of contact portions configured to contact the slider and disposed to be spaced apart from each other in a direction crossing the sliding direction and configured to apply force to the slider by vibrating the contact portions.

The driving force applying unit may further include a plurality of elastic plates including the contact portions on first surfaces thereof, a plurality of piezoelectric elements respectively disposed on the elastic plates and configured to generate vibrations in response to electrical signals applied thereto, and a base configured to support the elastic plates.

The piezoelectric elements may be connected to different electrical wirings, and the optical system is further configured to apply different electrical signals to the piezoelectric elements.

The contact portions may be configured to alternately contact the slider.

An actuator assembly may include a base plate; a slider coupled to the base plate and slidable along a sliding direction; and a driving force applying unit comprising a plurality of contact portions configured to contact the base plate and disposed in the slider to be spaced apart from each other in a direction crossing the sliding direction and configured to apply force to the base plate by vibrating the contact portions.

The driving force applying unit may include a plurality of elastic plates comprising the contact portions on first surface thereof and disposed in the slider, and a plurality of piezoelectric elements respectively disposed on the elastic plates and configured to generate vibrations in response to electrical signals applied thereto.

The piezoelectric elements may be connected to different electrical wirings, and the actuator assembly is further configured to apply different electrical signals to the piezoelectric elements.

The actuator assembly may further be configured to apply electrical signals having different phases to the piezoelectric elements.

The contact portions may be configured to alternately contact the base plate.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The invention will now be described more fully with reference to the accompanying drawings, in which exemplary embodiments of the invention are shown.

Figure 1:
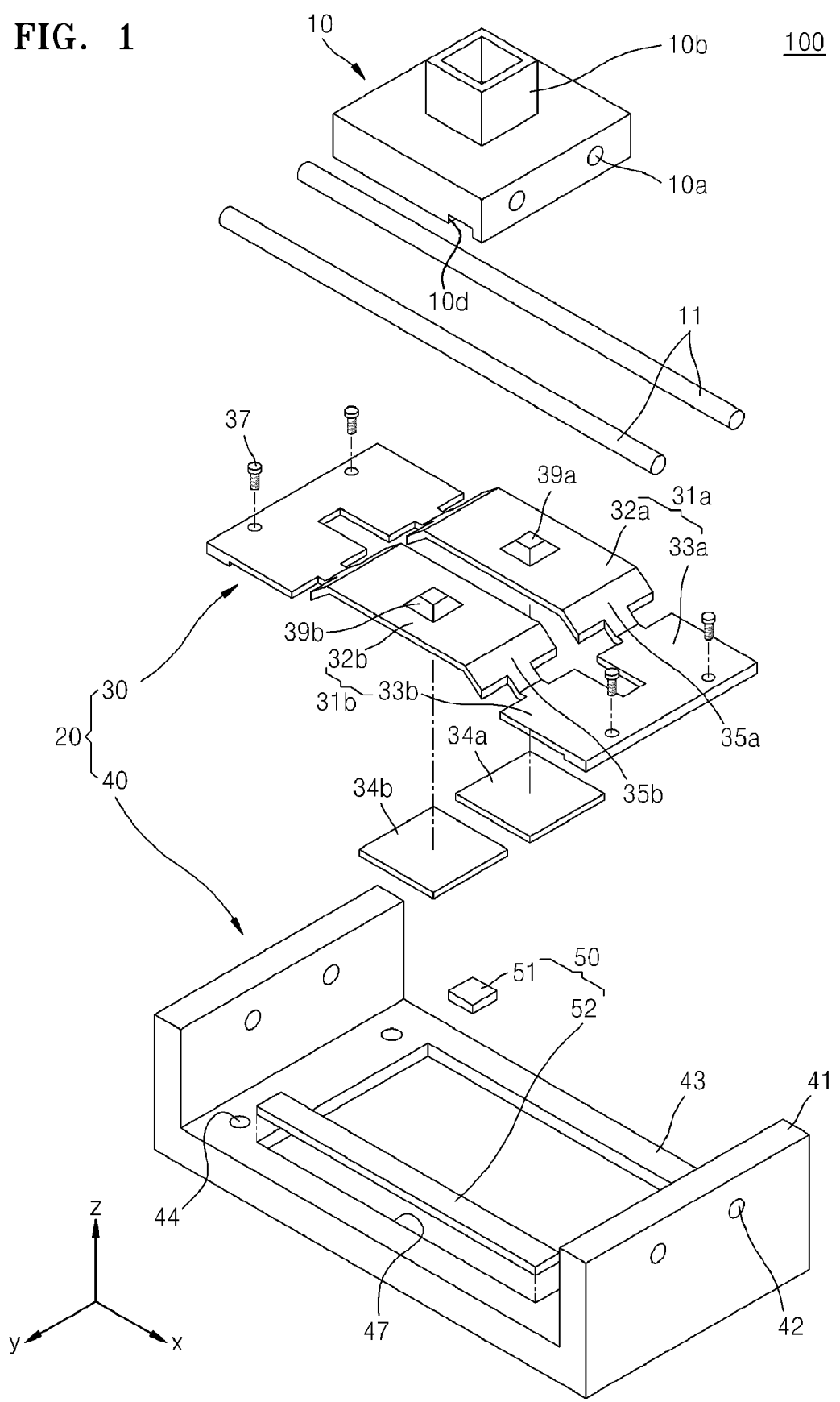
FIG. 1 is an exploded perspective view illustrating an actuator assembly according to an embodiment of the invention.
Figure 2:
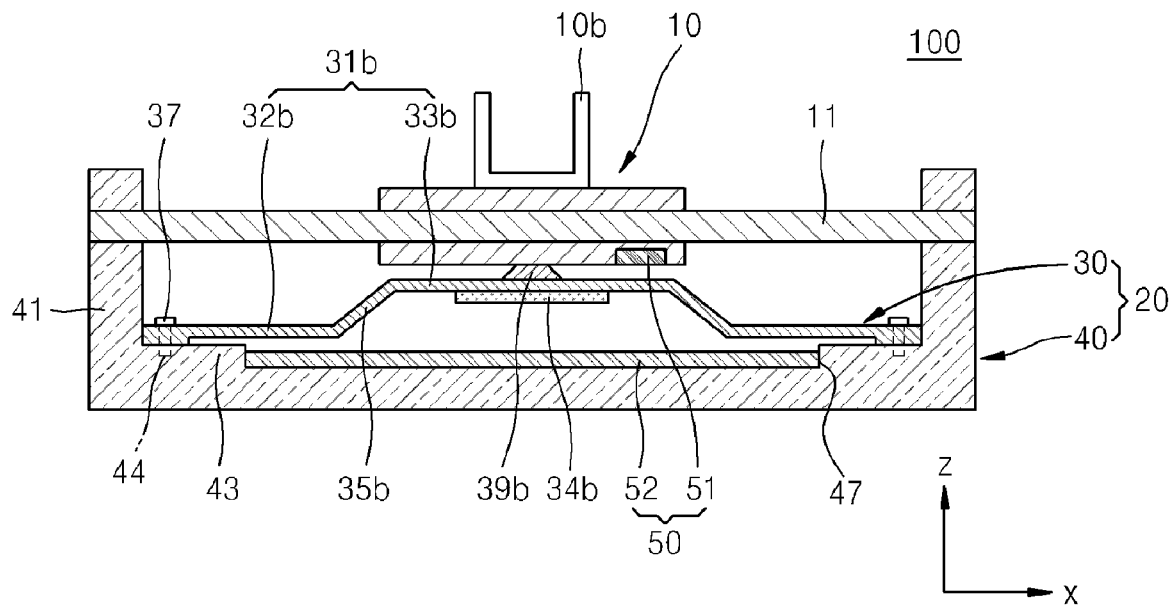
FIG. 2 is a side view illustrating a combination state of the actuator assembly of FIG. 1.
Figure 3:
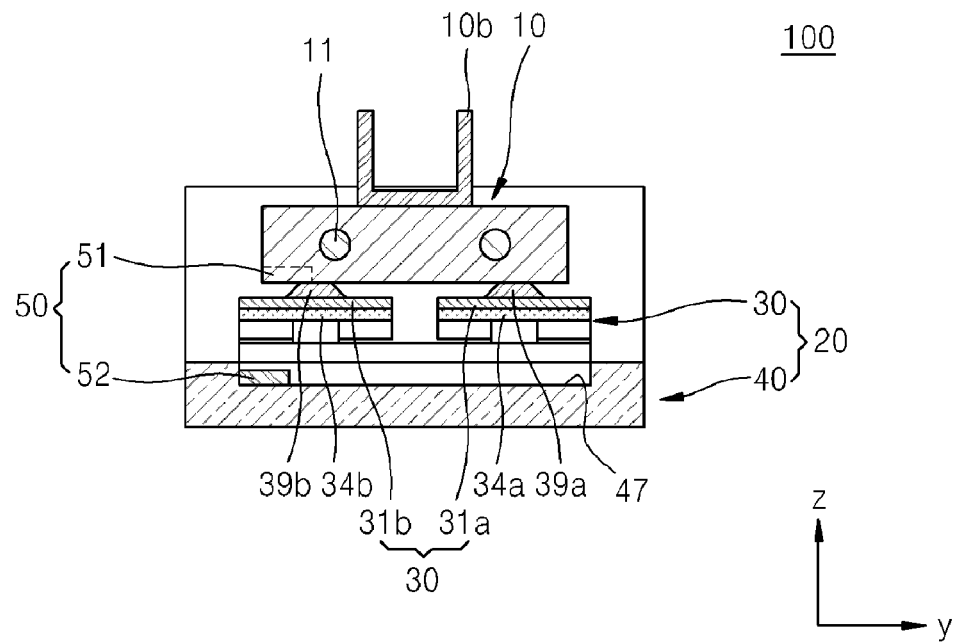
FIG. 3 is a front view illustrating the actuator assembly of FIG. 2.

FIG. 1 is an exploded perspective view illustrating a combination relationship between elements of an actuator assembly 100 according to an embodiment of the invention. FIG. 2 is a side view illustrating a combination state of the actuator assembly 100 of FIG. 1. FIG. 3 is a front view illustrating the actuator assembly 100 of FIG. 2.

The actuator assembly 100 includes a slider 10 that is slidable in one direction, a plurality of contact portions 39a and 39b contacting the slider 10, and a driving force applying unit 20 for applying force to the slider 10. The driving force applying unit 20 applies force to the slider 10 by vibrating the contact portions 39a and 39b contacting the slider 10.

The driving force applying unit 20 includes an elastic plate 30 including the contact portions 39a and 39b on a surface thereof, a plurality of piezoelectric elements 34a and 34b disposed in the elastic plate 30 and for generating vibrations, and a base plate 40 for supporting the elastic plate 30. The elastic plate 30 further includes a first elastic plate 31a and a second elastic plate 31b that are disposed in parallel to be spaced apart from each other in a direction crossing the sliding direction of the slider 10.

The base plate 40, which supports the first and second elastic plates 31a and 31b, may be coupled to a fixed structure of an optical system, which will be explained later.

The first and second elastic plates 31a and 31b are deformed by vibrations generated by the piezoelectric elements 34a and 34b and transmit the vibrations. The first and second elastic plates 31a and 31b may be formed of an elastic material. For example, the first and second elastic plates 31a and 31b may be manufactured by bending a plate formed of metal such as aluminum or stainless steel. Alternatively, the first and second elastic plates 31a and 31b may be formed of synthetic resin or rubber. The contact portions 39a and 39b protrude from respective first surfaces of the first and second elastic plates 31a and 31b. The contact portions 39a and 39b transmit the vibrations of the first and second elastic plates 31a and 31b to the slider 10 by contacting the slider 10.

The piezoelectric elements 34a and 34b may each be a multi-layered piezoelectric element including a stack of electrodes or a single-layered piezoelectric element. Once alternating current (AC) is applied to the piezoelectric elements 34a and 34b, the piezoelectric elements 34a and 34b generate vibrations according to a waveform of the AC. The piezoelectric elements 34a and 34b may be disposed on respective second surfaces of the first and second elastic plates 31a and 31b opposite to the first surfaces of the first and second elastic plates 31a and 31b on which the contact portions 39a and 39b are formed.

The slider 10 is slidably coupled to a plurality of sliding guides 11 disposed in the base plate 40 and may slide along, for example, an x direction. The sliding guides 11 are inserted into a plurality of sliding holes 10a of the slider 10, respectively. Both ends of each of the sliding guides 11 are fixed to two opposing supporting holes 42 formed in respective opposing vertical plates 41 of the base plate 40. A supporting block 10b to be coupled to an optical element of an optical system, which will be explained later, is disposed on the slider 10.

Figure 4:
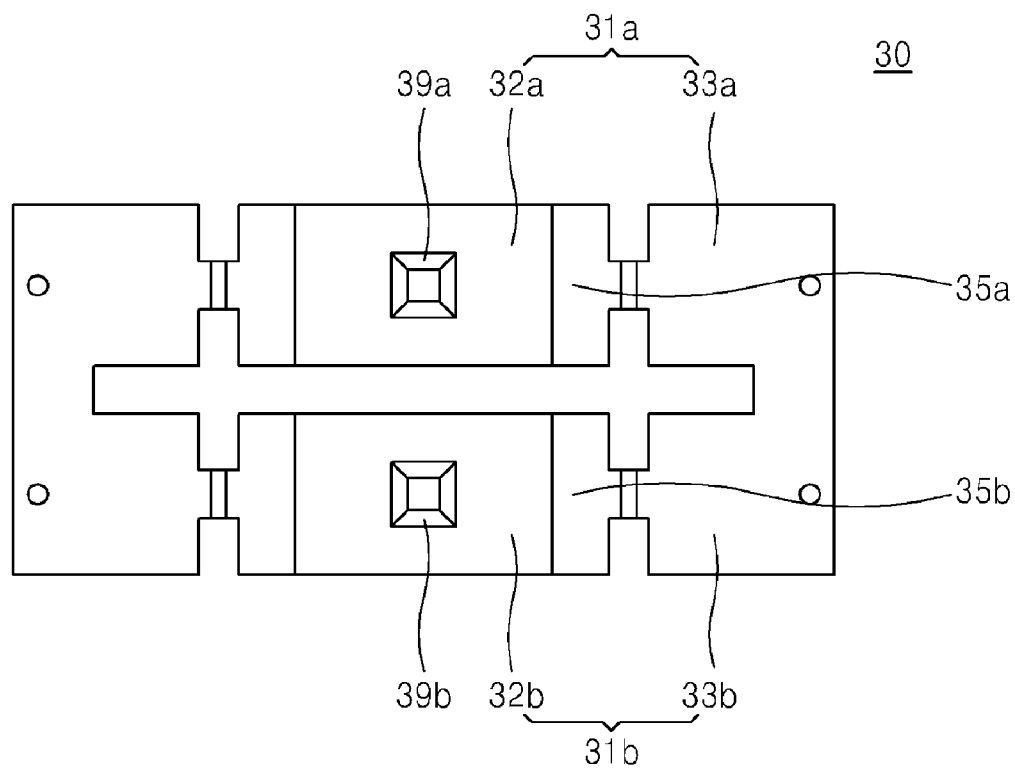
FIG. 4 is a plane view illustrating an elastic plate of the actuator assembly of FIG. 2.
Figure 5:
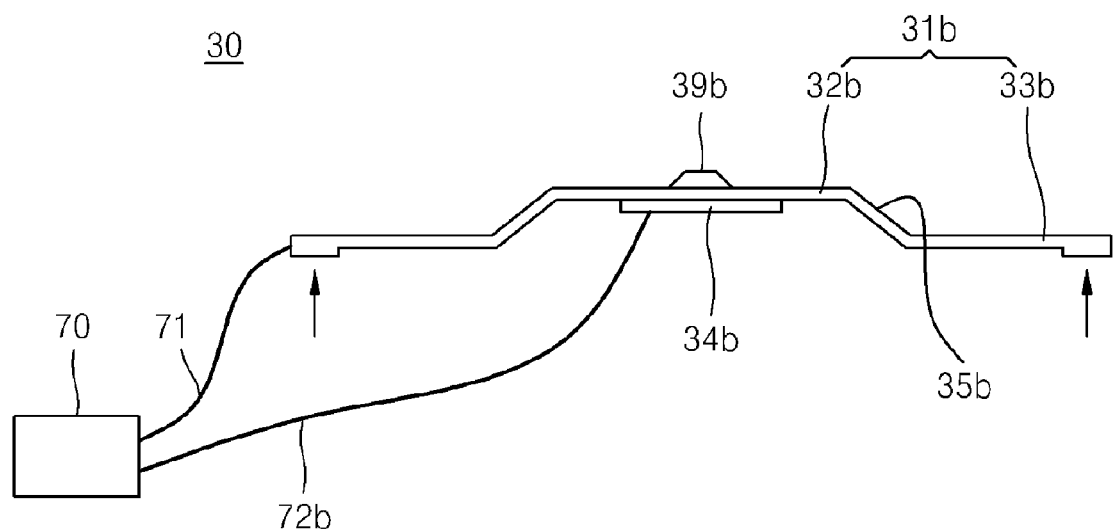
FIG. 5 is a side view illustrating the elastic plate of FIG. 4.
Figure 6:
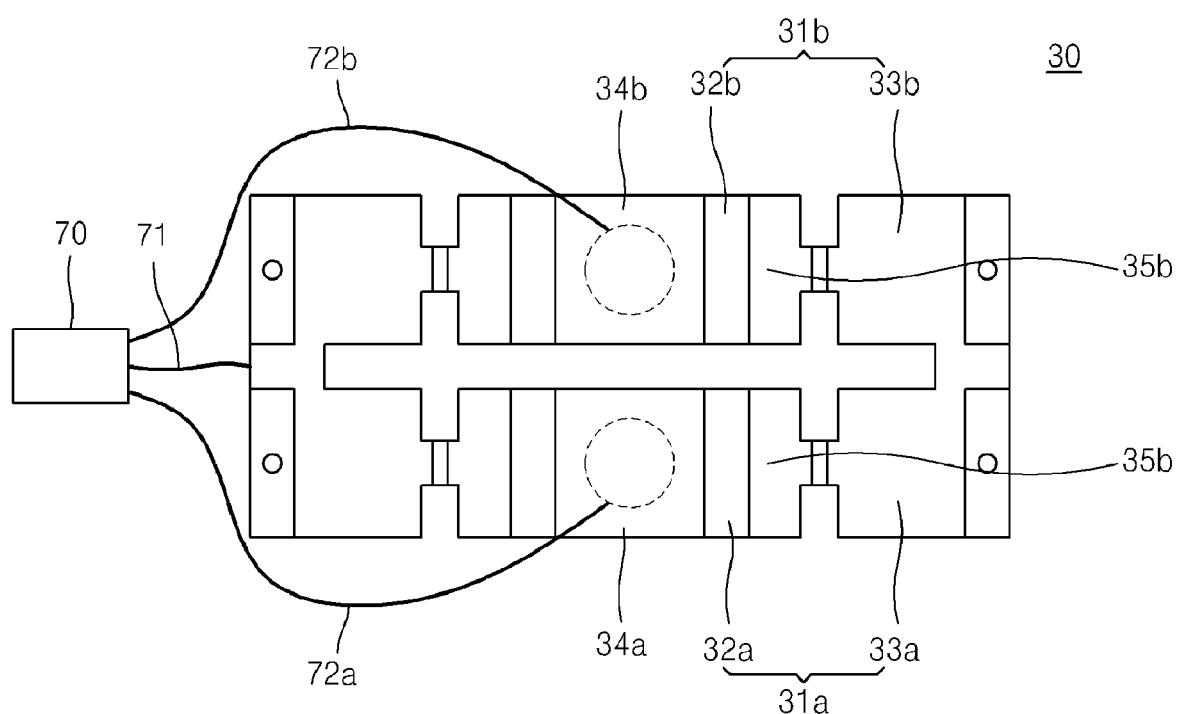
FIG. 6 is a bottom view illustrating the elastic plate of FIG. 4.

FIG. 4 is a plane view illustrating the elastic plate 30 of the actuator assembly 100 of FIG. 2. FIG. 5 is a side view illustrating the elastic plate 30 of FIG. 4. FIG. 6 is a bottom view illustrating the elastic plate 30 of FIG. 4.

The first and second elastic plates 31a and 31b include respective mounting portions 33a and 33b coupled to a horizontal plate 43 of the base plate 40 and respective elastic support portions 32a and 32b extending toward the slider 10 from the mounting portions 33a and 33b and spaced apart from the horizontal plate 43 of the base plate 40. The mounting portions 33a and 33b are coupled to the base plate 40 by using a plurality of coupling members 37 inserted into a plurality of insertion holes 44 of the horizontal plate 43. The coupling members 37 may each be any one of mechanical elements such as a rivet or a bolt.

The elastic support portions 32a and 32b are respectively connected to the mounting portions 33a and 33b by respective bent portions 35a and 35b bent from the mounting portions 33a and 33b in a direction away from the horizontal plate 43. The contact portions 39a and 39b are integrally formed with the first and second elastic plates 31a and 31b, respectively. However, the invention is not limited thereto, and the contact portions 39a and 39b may be separately formed of plastic or rubber and then attached to the first and second elastic plates 31a and 31b, respectively.

As described above, the first and second elastic plates 31a and 31b are disposed at a side of the slider 10 and the contact portions 39a and 39b are disposed spaced apart from each other in a direction crossing the sliding direction of the slider 10, namely, the x direction. For example, the contact portions 39a and 39b are disposed spaced apart from each other in a y direction. When different electric signals are respectively applied to the piezoelectric elements 34a and 34b so as to independently vibrate the first and second elastic plates 31a and 31b, the contact portions 39a and 39b may move and contact the slider 10 at different phases.

A plurality of signal wirings 72a and 72b are respectively connected to the piezoelectric elements 34a and 34b and apply different signals thereto. A common wiring 71 is connected to the mounting portions 33a and 33b of the first and second elastic plates 31a and 31b and applies a common signal thereto. The common wiring 71 and the signal wirings 72a and 72b are connected to a controller 70 for controlling electrical signals.

The controller 70 applies a common signal to the first and second elastic plates 31a and 31b via the common wiring 71. The common signal is applied to first surfaces of the piezoelectric elements 34a and 34b via the first and second elastic plates 31a and 31b. The controller 70 applies different electrical signals to second surfaces of the piezoelectric elements 34a and 34b respectively via the signal wirings 72a and 72b. Accordingly, the piezoelectric elements 34a and 34b are independently controlled, and thus the first and second elastic plates 31a and 31b may independently vibrate.

The actuator assembly 100 may further include a detection sensor 50 for detecting a position of the slider 10 along the sliding guides 11. The detection sensor 50 includes a magnetic bar 52 in which a plurality of magnets are connected to one another, and a detecting unit 51 for detecting magnetic properties of the magnetic bar 52. The magnetic bar 52 is disposed in a seating groove 47 formed in the horizontal plate 43 of the base plate 40. The detecting unit 51 is mounted on a sensor mounting portion 10d of the slider 10, and thus the position of the slider 10 may be detected.

Figure 7:
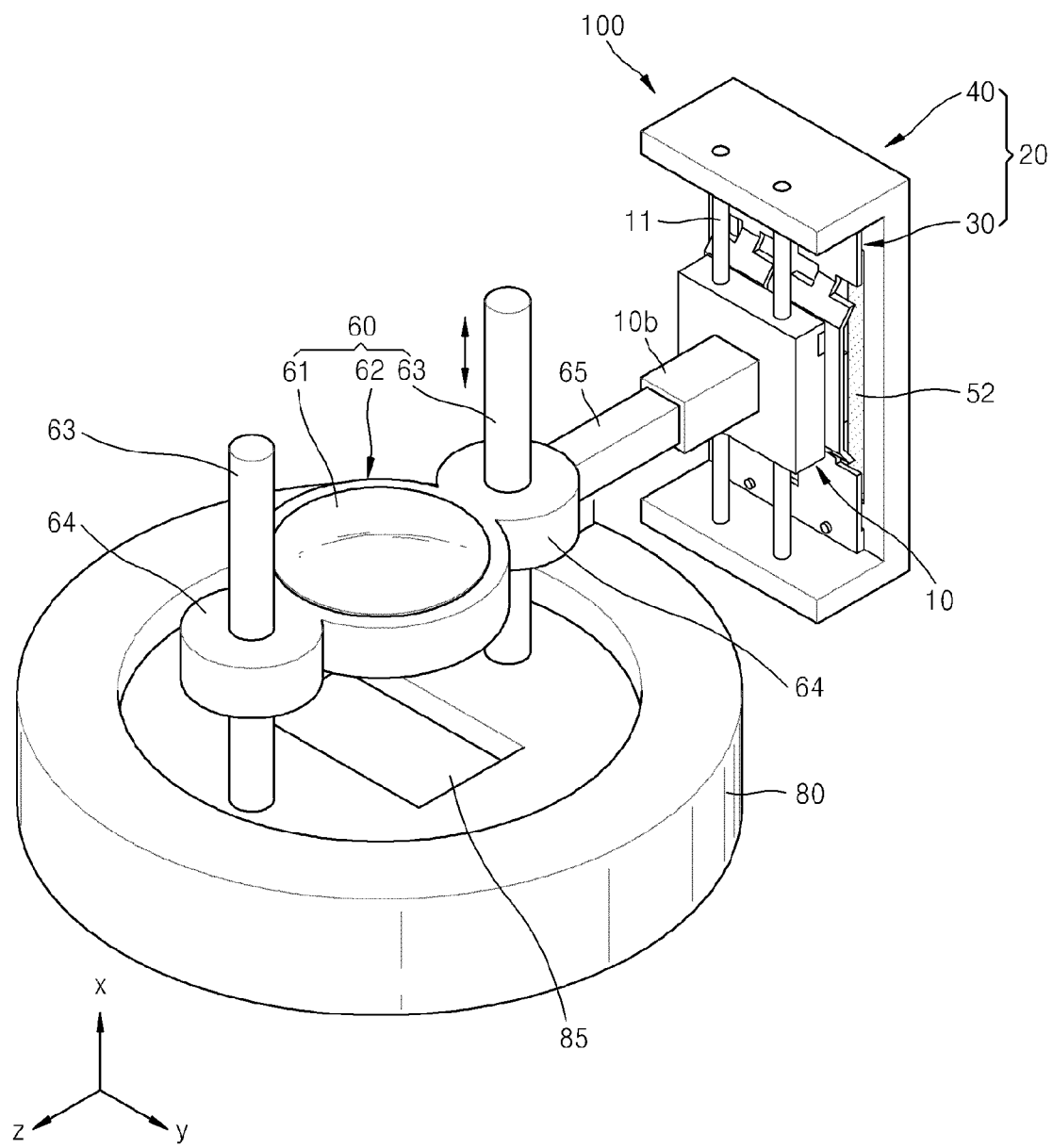
FIG. 7 is a perspective view illustrating some elements of an optical system including the actuator assembly of FIG. 1.

FIG. 7 is a perspective view illustrating some elements of an optical system including the actuator assembly 100 of FIG. 1.

The optical system illustrated in FIG. 7 includes the actuator assembly 100 illustrated in FIG. 1. The actuator assembly 100 of the optical system is used as a lens driving module for moving a lens unit 61. The lens driving module may perform zooming or auto-focusing by moving lenses to change a distance between the lenses.

A lens driving module used in a conventional optical system may include a relatively small motor for driving lenses. If the lens driving module used in the conventional optical system uses a stepper motor, that is, an electromagnetic motor, since a deceleration gear and a cam should be used to change a relatively fast rotational motion of the stepper motor into a linear motion, the structure of the conventional optical system is complicated, an error occurs due to backlash occurring when switching between forward rotation and backward rotation, power consumption is increased, and large amounts of current and heat are generated.

However, the optical system of the current embodiment employs the actuator assembly 100, which is driven by piezoelectric effects of the piezoelectric elements 34a and 34b, as a unit for moving the lens unit 61. Since the actuator assembly 100 can be manufactured as a relatively small motor, can obtain high torque during low speed operation, and can provide a precisely controlled amount of kinetic energy to the optical system, the actuator assembly 100 can be efficiently used as a relatively small lens driving module.

The optical system includes a lens assembly 60 including the lens unit 61 including at least one lens, a lens frame 62 for supporting the lens unit 61, and a guiding axis 63 for guiding movement of the lens frame 62, and the actuator assembly 100.

The guiding axis 63 of the lens assembly 60 is coupled to a base portion 80. An image pickup device 85 may be disposed on the base portion 80. The lens unit 61 of the lens assembly 60 moves in an optical axis direction along the guiding axis 63 to direct light indicating an image of a subject onto the image pickup device 85.

Sliding portions 64 slidably fitted around the guiding axis 63 are disposed on ends of the lens frame 62 of the lens assembly 60. A connection block 65 is formed on an end of one of the sliding portions 64 to be coupled to a supporting block 410b (see FIG. 13) of the actuator assembly 100.

Although not shown in the drawing, a housing may be coupled to the base portion 80 so as to surround the lens assembly 60. If the base plate 40 of the actuator assembly 100 is coupled to the housing, the housing may stably support the actuator assembly 100 even while the piezoelectric elements 34a and 34b vibrate.

If the piezoelectric elements 34a and 34b vibrate, the vibrations are transmitted through the elastic plate 30, and thus the lens assembly 60 may slide in the x direction along the guiding axis 63.

Figure 8:
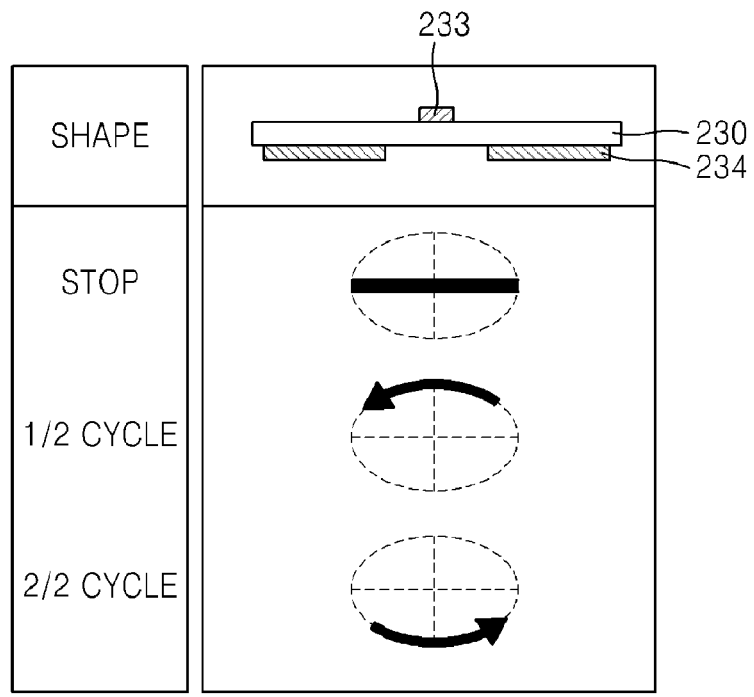
FIG. 8 is a view for explaining operations of an actuator assembly according to another embodiment of the invention.

FIG. 8 is a view for explaining operations of an actuator assembly according to another embodiment of the invention.

In the actuator assembly of FIG. 8, vibrations of a piezoelectric element 234 are transmitted through an elastic plate 230 to vibrate a contact portion 233. The contact portion 233 is the only contact portion contacting a slider.

An oval corresponding to 'stop' of FIG. 8 represents an immobile state of the actuator assembly. An arrow marked on an oval corresponding to '½ cycle' represents a state where the contact portion 233 contacts and drives the slider during a half cycle of a motion cycle of the actuator assembly.

An arrow marked on an oval corresponding to '2/2 cycle' represents a state where the contact portion 233 moves away from the slider during the other half cycle of the motion cycle of the actuator assembly and returns to an initial position.

Thus, in the actuator assembly of FIG. 8, the slider is directly driven in a 50% region of the entire driving time, and the slider is driven by inertia in the other 50% region. The region driven by inertia has low driving reliability compared to the region driven directly. In the region driven by inertia, gravity affects the motion of the actuator assembly, thereby causing a great driving offset when a disturbance occurs.

Figure 9:
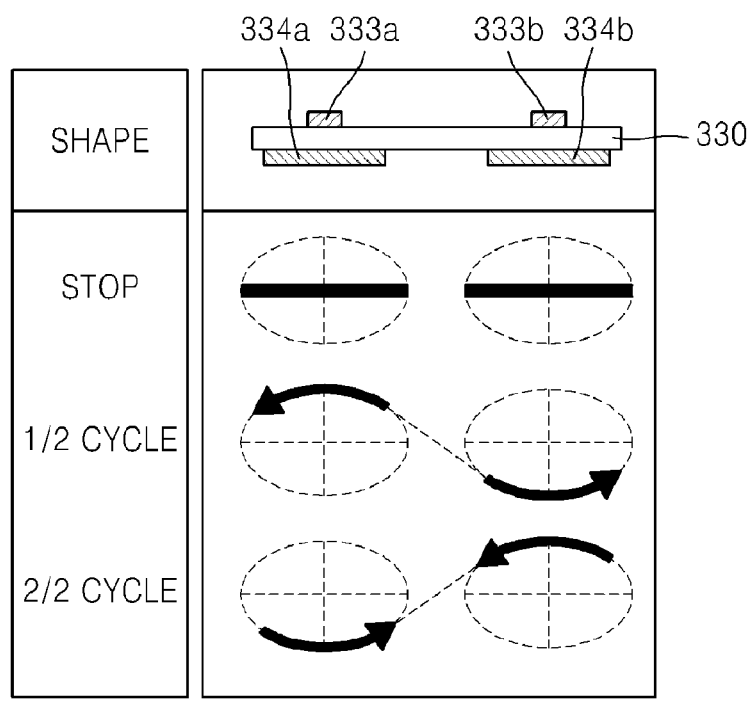
FIG. 9 is a view for explaining operations of an actuator assembly according to another embodiment of the invention.

FIG. 9 is a view for explaining operations of an actuator assembly according to another embodiment of the invention.

In the actuator assembly of FIG. 9, there are two contact portions 333a and 333b. When vibrations of piezoelectric elements 334a and 334b are transmitted through an elastic plate 330, the contact portions 333a and 333b vibrate. Unlike actuator assemblies according to embodiments of the invention, the contact portions 333a and 333b are disposed in series to be spaced apart from each other along a sliding direction of a slider.

Unlike the actuator assembly of FIG. 8, the actuator assembly of FIG. 9 includes the two contact portions 333a and 333b, and thus a driving region due to inertia may be decreased by adjusting a phase difference between the contact portions 333a and 333b. However, in the actuator assembly of FIG. 9, a space for ensuring a reciprocating motion stroke of the slider may be increased. That is, a length of an apparatus for moving the slider, namely, a length of a sliding guide, should be designed to be greater than a distance between the contact portions 333a and 333b. Accordingly, a length of the actuator assembly of FIG. 9 is increased.

In the actuator assembly of FIG. 9, the contact portions 333a and 333b are disposed on the single elastic plate 330 and are driven when the piezoelectric elements 334a and 334b are driven. Thus, deviations and unstable motions occurred in the contact portion 333a are transmitted to the contact portion 333b, thereby affecting the entire mechanical characteristic, a frequency characteristic, and the entire driving efficiency of the actuator assembly. When an actuator assembly having driving frequencies within a small bandwidth is designed, the above-described problems may become more serious. Thus, extremely high precision is required in designing distances between the contact portions 333a and 333b and between the piezoelectric elements 334a and 334b.

Figure 10:
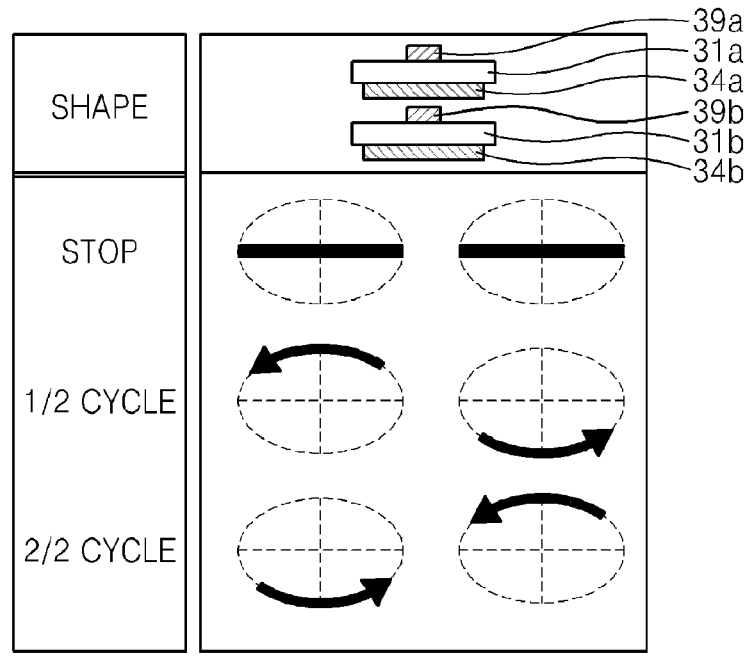
FIG. 10 is a view for explaining operations of the actuator assembly of FIG. 2.
Figure 11:
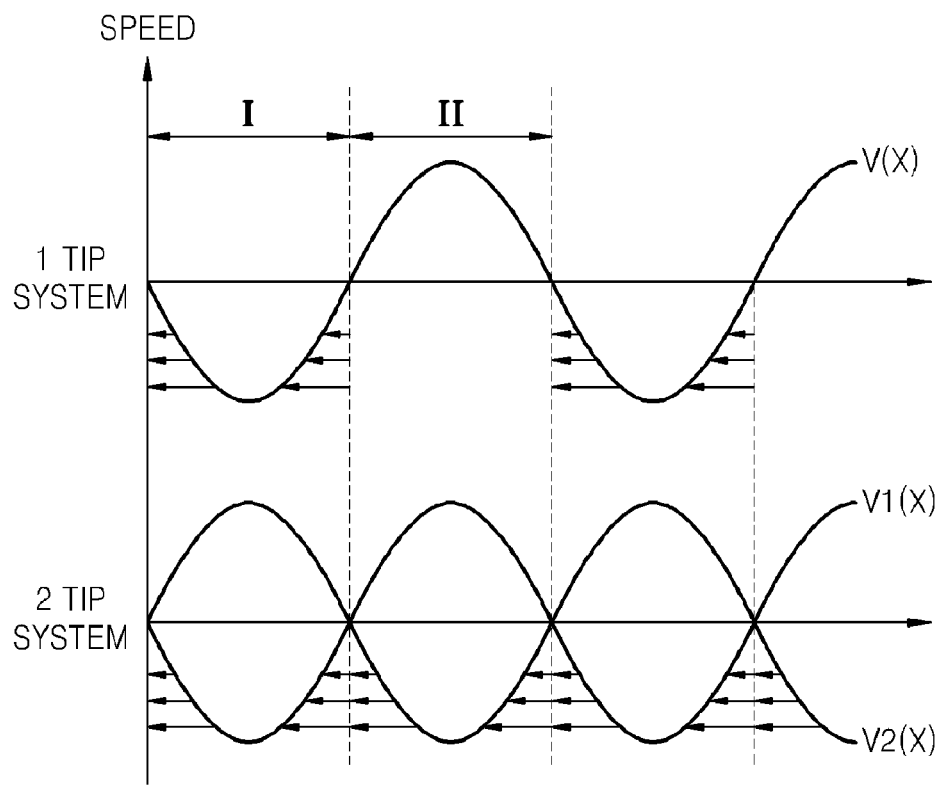
FIG. 11 is a graph comparing the operations of the actuator assembly of FIG. 2 and the operations of the actuator assembly of FIG. 8.

FIG. 10 is a view for explaining operations of the actuator assembly 100 of FIG. 2. FIG. 11 is a graph comparing the operations of the actuator assembly of FIG. 2 and the operations of the actuator assembly of FIG. 8.

Referring to FIG. 10, the contact portions 39a and 39b are disposed on the first and second elastic plates 31a and 31b, respectively. Different electrical signals are respectively applied to the piezoelectric elements 34a and 34b, so that the piezoelectric elements 34a and 34b may be independently controlled and thus the contact portions 39a and 39b may independently move.

Figure 12:
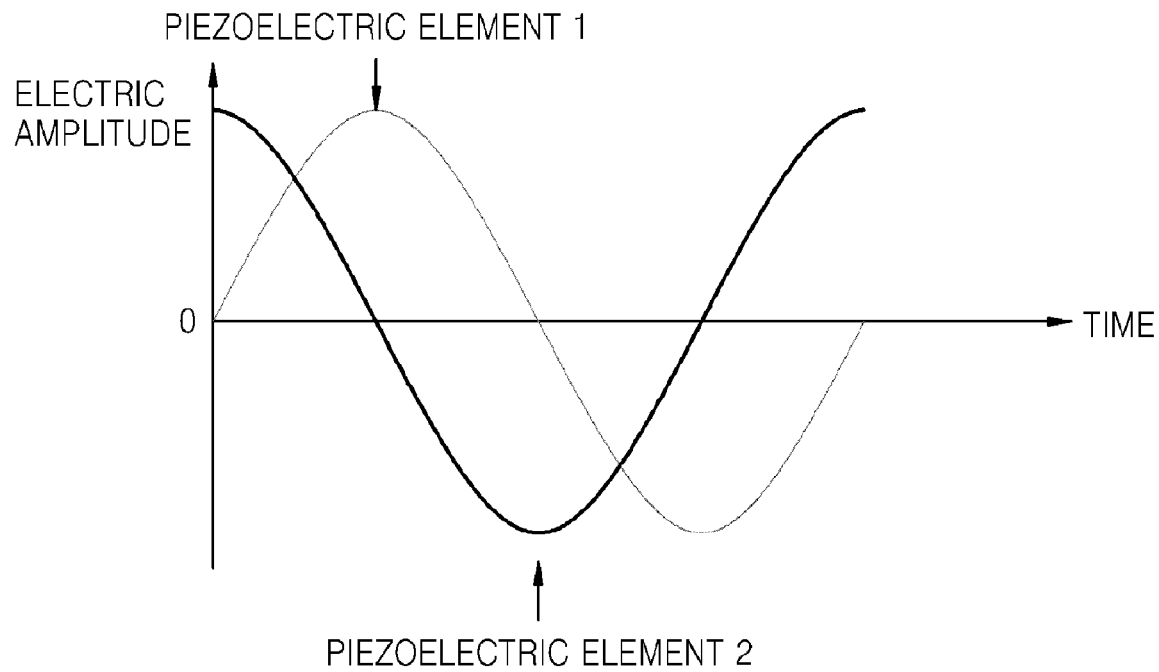
FIG. 12 is a graph illustrating an example of an electrical signal applied to the actuator assembly of FIG. 2.

FIG. 12 is a graph illustrating an example of an electrical signal applied to the actuator assembly 100 of FIG. 2.

For example, a sine wave electrical signal is applied to a piezoelectric element 1 that is one of the piezoelectric elements 34a and 34b, and a sine wave electrical signal at a different phase is applied to a piezoelectric element 2 that is the other one of the piezoelectric elements 34a and 34b, so that the piezoelectric elements 34a and 34b may alternately vibrate. However, the invention is not limited thereto, and electrical signals having different cycles may be respectively applied to the piezoelectric elements 34a and 34b so as to vibrate the piezoelectric elements 34a and 34b in different ways.

Referring to FIG. 11, the graph illustrates moving speeds of the contact portions 39a and 39b, and illustrates that the contact portions 39a and 39b move in different trajectories of V1(X) and V2(X). The contact portion of FIG. 8 including the single contact portion 233 moves to follow an approximately sine wave form, and thus the contact portion 233 does not contact the slider in the region corresponding to the '½ cycle', that is, in a region I of FIG. 11, and contacts the slider in the region corresponding to the '2/2 cycle', that is, in a region II of FIG. 11.

Now, motions of the contact portions 39a and 39b of the actuator assembly 100 will be described below. The contact portion 39a of the actuator assembly d100 rives the slider 10 in the region corresponding to the '½ cycle', that is, in the region I of FIG. 11, and the contact portion 39b moves away from the slider 10 and returns to its initial position.

In the region corresponding to the '2/2 cycle', that is, in the region II of FIG. 11, the contact portion 39a of the actuator assembly 100 moves away from the slider 10 and returns to its initial position, and the contact portion 39b drives the slider 10.

As such, the contact portions 39a and 39b alternately contact the slider 10 and move the slider 10 in the regions corresponding to the '½ cycle' and the '2/2 cycle'. Thus, a region driven by inertia is not present because one of the contact portions 39a and 39b is always in contact with the slider 10, thereby improving driving reliability of the actuator assembly 100.

In addition, the contact portions 39a and 39b are disposed in parallel to be spaced apart from each other in a direction crossing the sliding direction of the slider 10, and thus a space for the contact portions 39a and 39b may be minimized.

Furthermore, the contact portions 39a and 39b are respectively coupled to the first and second elastic plates 31a and 31b, which are independently vibrated, and thus a deviation occurring in one of the contact portions 39a and 39b does not affect the other one.

When the slider 10 and the contact portions 39a and 39b are assembled together before being assembled to an optical system, a pre-load of the actuator assembly 100 itself is set up in a state where the contact portions 39a and 39b are disposed on the same portion, and thus the actuator assembly may be stably driven.

When the actuator assembly 100 is assembled to an optical system requiring driving frequencies in a wide bandwidth, vibration mode tuning is performed according to shapes and structures of the contact portions 39a and 39b and the first and second elastic plates 31a and 31b, to cause a difference between frequencies for optimal driving of the contact portions 39a and 39b.

Figure 13:
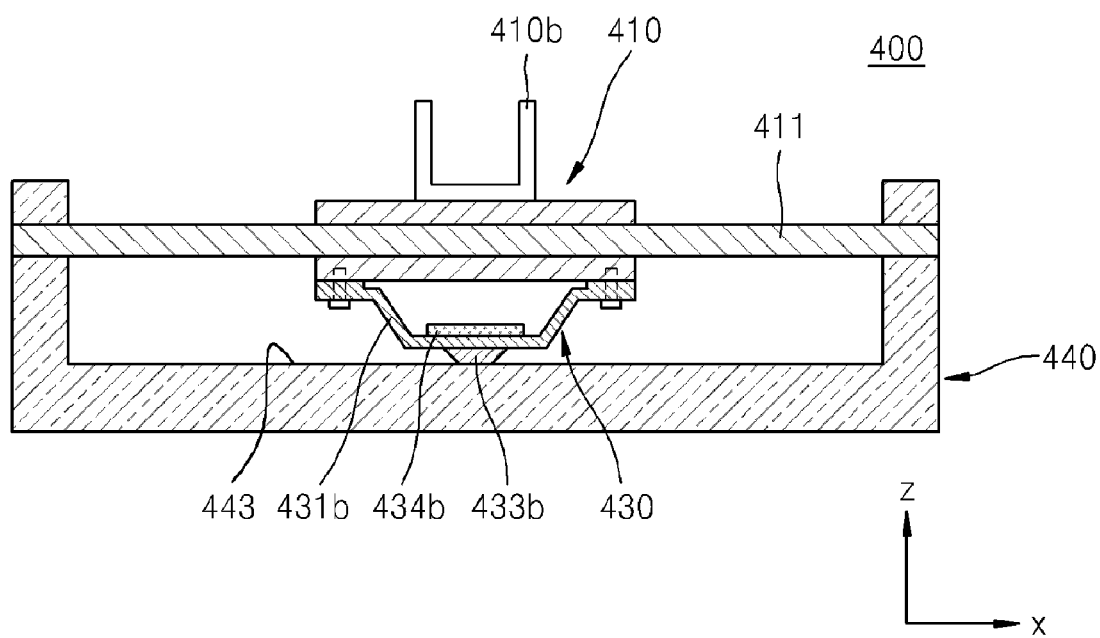
FIG. 13 is a side view illustrating an actuator assembly according to another embodiment of the invention.
Figure 14:
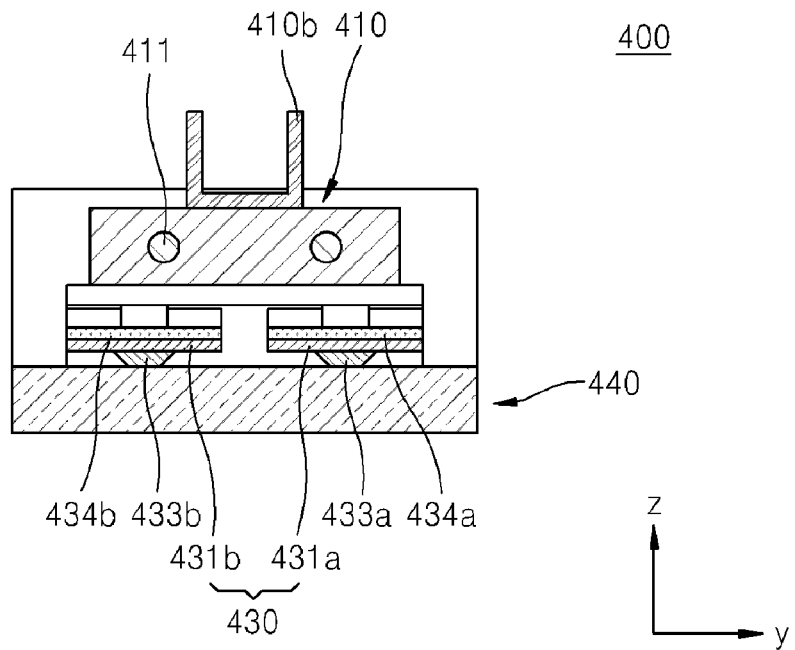
FIG. 14 is a front view illustrating the actuator assembly of FIG. 13.

FIG. 13 is a side view illustrating the actuator assembly of FIG. 9. FIG. 14 is a front view illustrating the actuator assembly of FIG. 13.

The actuator assembly, here an actuator assembly 400, according to embodiments of FIGS. 13 and 14 includes a base plate 440, a slider 410 slidably coupled to the base plate 440 and may slide in one direction, and a driving force applying unit 430 disposed on the slider 410 and for applying force to the base plate 440 via vibrations. The driving force applying unit 430 applies force to the base plate 440 by vibrating a plurality of contact portions 433a and 433b contacting the slider 410.

In the actuator assembly 100 of FIGS. 1 through 4, the elastic plate 30 is coupled to the base plate 40, and the contact portions 39a and 39b included in the elastic plate 30 moves the slider 10 by contacting the slider 10. However, in the actuator assembly 400 of FIGS. 13 and 14, a plurality of elastic plates 431a and 431b are attached to the slider 410, and the contact portions 433a and 433b are attached to the elastic plates 431a and 431b to apply force to the base plate 440 by contacting the base plate 440.

The driving force applying unit 430 includes the plurality of elastic plates 431a and 431b disposed in the slider 410 and including the contact portions 433a and 433b on first surfaces thereof, and piezoelectric elements 434a and 434b respectively disposed on the elastic plates 431a and 431b and for generating vibration when electrical signals are applied thereto. The elastic plates 431a and 431b are disposed in parallel to be spaced apart from each other in a direction crossing the sliding direction of the slider 410.

The slider 410, which is slidably coupled to a plurality of sliding guides 411 disposed in the base plate 440, slides in, for example, an x direction. A supporting block 410b to be coupled to optical elements of an optical system is disposed on the slider 410.

Different electrical signals are respectively applied to the piezoelectric elements 434a and 434b. Thus, if the elastic plates 431a and 431b independently vibrate, the contact portions 433a and 433b may move at different phases and may contact a surface of the base plate 440.

According to the actuator assembly 400 according to the current embodiment, since the contact portions 433a and 433b are disposed in parallel to be spaced apart from each other in a direction crossing the sliding direction of the slider 410, the actuator assembly 400 may have a compact structure. In addition, the piezoelectric elements 434a and 434b are independently driven, so that the contact portions 433a and 433b may independently move and alternately contact the base plate 440, and thus the actuator assembly 400 may be stably driven.

Figure 15:
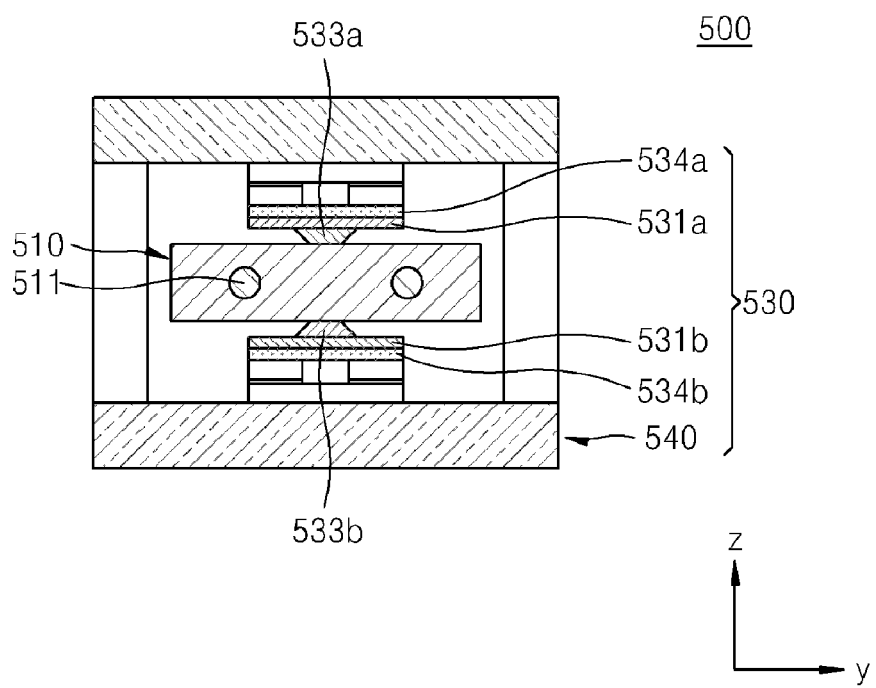
FIG. 15 is a side view illustrating an actuator assembly according to another embodiment of the invention.

FIG. 15 is a side view illustrating an actuator assembly 500 according to another embodiment of the invention.

The actuator assembly 500 of FIG. 15 includes a slider 510 slidable in one direction, and a driving force applying unit 530 including a plurality of contact portions 533a and 533b contacting the slider 510 and for applying force to the slider 510.

The driving force applying unit 530 applies force to the slider 510 by vibrating the contact portions 533a and 533b contacting the slider 510.

The contact portions 533a and 533b, which are disposed symmetrically around the slider 510, are disposed in parallel to be spaced apart from each other in a direction crossing the sliding direction of the slider 510. Unlike the above-described embodiments including contact portions disposed at a side of a slider, in the actuator assembly 500 of FIG. 15, the contact portions 533a and 533b are disposed symmetrically around the slider 510, and thus force is symmetrically applied to the slider 510, thereby stably driving the actuator assembly 500.

The driving force applying unit 530 includes a plurality of elastic plates 531a and 531b including the contact portions 533a and 533b on first surfaces thereof, a plurality of piezoelectric elements 534a and 534b respectively disposed on the elastic plates 531a and 531b and for generating vibration, and a base plate 540 for supporting the elastic plates 531a and 531b.

The slider 510 may be slidably coupled to a plurality of sliding guides 511 disposed in the base plate 540, and thus may slide along the sliding guides 511.

In the actuator assembly 500 having the above-described structure, since the contact portions 533a and 533b for driving the slider 510 are disposed to be spaced apart from each other in a direction crossing the sliding direction of the slider 510, the actuator assembly 500 may have a compact structure. In addition, the contact portions 533a and 533b are disposed symmetrically around the slider 510, and thus the actuator assembly 500 may be stably driven.

According to an actuator assembly and an optical system including the same according to the invention, since contact portions alternately move so as to apply force, driving reliabilities of the actuator assembly and the optical system can be improved.

Also, since the contact portions are disposed in parallel to be spaced apart from each other in a direction crossing a sliding direction of a slider, a space for the contact portions in the actuator assembly can be minimized, and thus the actuator assembly may have a compact structure.

In addition, since the contact portions are coupled to respective elastic plates that independently vibrate, a deviation occurred in one of the contact portions does not affect the other one, and thus the actuator assembly may achieve precision position control.

Furthermore, a pre-load of the actuator assembly itself is set up in a state where the contact portions are disposed on the same portion, and thus the actuator assembly may be stably driven.

The device described herein may comprise a processor, a memory for storing program data and executing the data, a permanent storage such as a disk drive, a communications port for handling communications with external devices, and user interface devices, including a display, keys, etc. When software modules are involved, these software modules may be stored as program instructions or computer readable codes executable by a processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An actuator assembly comprising:
a slider configured to be slidable along a sliding direction; and
a driving force applying unit comprising a plurality of contact portions disposed to be spaced apart from each other in a direction crossing the sliding direction of the slider and for applying force to the slider by vibrating the contact portions.

2. The actuator assembly of claim 1, wherein the driving force applying unit further comprises a plurality of elastic plates comprising the contact portions on first surfaces thereof, a plurality of piezoelectric elements respectively disposed on the elastic plates, the plurality of piezoelectric elements configured to generate vibrations when electrical signals are applied thereto, and a base plate for supporting the elastic plates.

3. The actuator assembly of claim 2, wherein the actuator assembly is further configured to apply different electrical signals to the piezoelectric elements via different electrical wirings connected to the piezoelectric elements.

4. The actuator assembly of claim 3, wherein the actuator assembly is further configured to apply electrical signals having different phases to the piezoelectric elements.

5. The actuator assembly of claim 3, wherein the actuator assembly is further configured to apply electrical signals having different cycles to the piezoelectric elements.

6. The actuator assembly of claim 3, wherein the contact portions are configured to alternately contact the slider.

7. The actuator assembly of claim 2, wherein the elastic plates comprise respective mounting portions coupled to the base plate and respective elastic support portions extending toward the slider from the mounting portions and spaced apart from the base plate, wherein the contact portions are respectively disposed on the elastic support portions.

8. The actuator assembly of claim 7, wherein the mounting portions of at least two of the elastic plates are connected to each other.

9. The actuator assembly of claim 8, wherein the actuator assembly is further configured to apply a common signal to the elastic plates and different signals to the piezoelectric elements, and wherein the piezoelectric elements are connected to different electrical wirings.

10. The actuator assembly of claim 1, wherein the contact portions are disposed at a side of the slider.

11. The actuator assembly of claim 1, wherein the contact portions are disposed symmetrically around the slider.

12. An optical system comprising:
a lens assembly comprising a lens unit comprising at least one lens and a moveable lens frame supporting the lens unit; and
an actuator assembly comprising a slider slidable along a sliding direction, and a driving force applying unit comprising a plurality of contact portions configured to contact the slider and disposed to be spaced apart from each other in a direction crossing the sliding direction and configured to apply force to the slider by vibrating the contact portions.

13. The optical system of claim 12, wherein the driving force applying unit further comprises a plurality of elastic plates comprising the contact portions on first surfaces thereof, a plurality of piezoelectric elements respectively disposed on the elastic plates and configured to generate vibrations in response to electrical signals applied thereto, and a base configured to support the elastic plates.

14. The optical system of claim 13, wherein the piezoelectric elements are connected to different electrical wirings, and the optical system is further configured to apply different electrical signals to the piezoelectric elements.

15. The optical system of claim 14, wherein the contact portions are configured to alternately contact the slider.

16. An actuator assembly comprising:
a base plate;
a slider coupled to the base plate and slidable along a sliding direction; and
a driving force applying unit comprising a plurality of contact portions configured to contact the base plate and disposed in the slider to be spaced apart from each other in a direction crossing the sliding direction and configured to apply force to the base plate by vibrating the contact portions.

17. The actuator assembly of claim 16, wherein the driving force applying unit comprises a plurality of elastic plates comprising the contact portions on first surface thereof and disposed in the slider, and a plurality of piezoelectric elements respectively disposed on the elastic plates and configured to generate vibrations in response to electrical signals applied thereto.

18. The actuator assembly of claim 17, wherein the piezoelectric elements are connected to different electrical wirings, and the actuator assembly is further configured to apply different electrical signals to the piezoelectric elements.

19. The actuator assembly of claim 18, wherein the actuator assembly is further configured to apply electrical signals having different phases to the piezoelectric elements.

20. The actuator assembly of claim 19, wherein the contact portions are configured to alternately contact the base plate.

* * * * *